United States Patent
Meckstroth

(10) Patent No.: US 6,884,194 B2
(45) Date of Patent: Apr. 26, 2005

(54) HYDRAULIC ASYMMETRIC DAMPED BELT TENSIONER

(75) Inventor: Richard J. Meckstroth, Vonore, TN (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/071,629

(22) Filed: Feb. 7, 2002

(65) Prior Publication Data

US 2003/0148838 A1 Aug. 7, 2003

(51) Int. Cl.⁷ .................................................. F16H 7/08
(52) U.S. Cl. ..................................... 474/135; 474/110
(58) Field of Search ................................ 474/135, 136, 474/133, 138, 112, 109, 117, 113–116; 137/38, 527.8, 527, 248, 340, 625.65, 625.44; 251/75, 58, 228, 60, 90

(56) References Cited

U.S. PATENT DOCUMENTS

| | | | |
|---|---|---|---|
| 3,685,792 A | * | 8/1972 | Henning ........................ 251/75 |
| 4,144,902 A | * | 3/1979 | Mahr et al. .................. 137/248 |
| 4,583,962 A | | 4/1986 | Bytzek et al. |
| 4,596,538 A | | 6/1986 | Henderson |
| 4,607,662 A | * | 8/1986 | Hama et al. ............ 137/625.65 |
| 4,822,322 A | | 4/1989 | Martin |
| 4,832,666 A | | 5/1989 | Henderson |
| 4,938,734 A | | 7/1990 | Green et al. |
| 4,969,858 A | * | 11/1990 | Hertrich et al. .............. 474/135 |
| 5,030,172 A | | 7/1991 | Green et al. |
| 5,035,679 A | | 7/1991 | Green et al. |
| 5,052,982 A | | 10/1991 | Ouchi |
| 5,171,188 A | | 12/1992 | Lardrot et al. |
| 5,186,689 A | * | 2/1993 | Yamamoto et al. .......... 474/112 |
| 5,190,502 A | | 3/1993 | Gardner et al. |
| 5,348,514 A | | 9/1994 | Foley |
| 5,354,242 A | | 10/1994 | St. John |
| 5,443,424 A | | 8/1995 | Henderson |
| 5,558,587 A | * | 9/1996 | Church ........................ 474/112 |
| 5,630,767 A | * | 5/1997 | Hirabayashi et al. ........ 474/110 |
| 5,924,947 A | | 7/1999 | Williams |
| 5,935,032 A | | 8/1999 | Bral |
| 6,165,091 A | * | 12/2000 | Dinca et al. ................. 474/112 |

FOREIGN PATENT DOCUMENTS

| | | | | |
|---|---|---|---|---|
| JP | 02-245556 A | * | 10/1991 | .................. 474/135 |
| JP | 06-159458 | | * 6/1994 | .................. 474/110 |

* cited by examiner

Primary Examiner—Marcus Charles
(74) Attorney, Agent, or Firm—Joseph V. Tassone; Thompson Hine LLP

(57) ABSTRACT

A belt tensioner for a power transmission belt may be provided that operates on an endless path and that utilizes asymmetric motion control. The belt tensioner may have an arm with a belt engaging section and a drum section, a support member for securing the tensioner relative to the belt, where the arm pivots on the support member, and a tension spring that urges the arm to pivot about the support member in a first direction and urges the belt engaging section against the belt with a force to tension the belt. The tensioner also may have a fluid filled chamber inside a portion of the drum section of the arm and a value pivotally attached to the tensioner so that the valve extends across the fluid containing chamber.

22 Claims, 3 Drawing Sheets

HYDRAULIC ASYMMETRIC DAMPED BELT TENSIONER

RELATED APPLICATIONS

Two related applications are U.S. Ser. Nos. 10/029,440 and 10/029,442 to Meckstroth et. al. entitled "Unidirectional Motion Asymmetric Damped Tensioner" and "Dual Friction Surface Asymmetric Damped Tensioner", respectively.

FIELD OF THE EMBODIMENTS

This embodiments relate to a new method and apparatus for a belt tensioner.

BACKGROUND

Many automobile engines currently on the market utilize an endless power transmission belt for driving a plurality of driven accessories. They employ a tensioning system utilized to provide a tensioning force on the endless power transmission belt, which may be of any suitable type known in the art. Preferably, the belt is made of Neoprene or EPDM, and having a polyester, or KEVLAR (aramid) load-carrying cord, because the unique features of the tensioner of these embodiments readily permit the tensioner to tension such a belt in an efficient manner.

In many of these automotive accessory drives it is necessary to provide a correct tension to control a tension ratio throughout the life of the belt. With the advent of the single belt V-ribbed drive system, this is of increasing importance since belts are longer and some accessories are driven off the backside of the belt as a flat belt drive. Automatic tensioners of various descriptions have been developed having the requisite characteristics enabling them to tune the belt system to remove input torsionals and prevent or reduce harmonics, while allowing the tensioner to respond to changes in the belt tension requirements. For instance, see U.S. Pat. Nos. 4,596,538, 4,832,666, and 5,443,424 to Henderson, 4,938,734, 5,030,172 and 5,035,679 to Green, et. al., 5,190,502 to Gardner, et al., or 5,348,514 to Foley, all now incorporated into this application by this reference thereto. A problem is that a torsion spring cannot be made that will apply a different torsion depending on motion direction, to both resiliently tension a belt and prevent bubble or slack length from developing in the belt during periods of extreme engine deceleration. It is this limitation that creates the need for asymmetric damping. For optimal function of a V-ribbed, flat belt, or V belt tensioner, it is desirable that the tensioner moves easily and quickly toward the belt to take up slack (spring unwind direction), but provide more than the same resistance to a belt lifting the tensioner away from the belt (spring windup direction). This feature is desirable for proper control of steady state accessory torque loads that are occasionally interrupted with a non-steady state or reverse transient load, such as a wide-open-throttle (WOT) one-two gear shift in manual and automatic transmission. During WOT, the engine suddenly goes from, for example, 5000 RPM to 3500 RPM, which is similar to putting a brake on the engine. The tensioner then becomes an untensioner, which can cause belt slip, because the tensioner cannot sufficiently react the high transient tension.

Also, allowing the tensioner to move easily and quickly toward the belt to take up slack (spring unwind direction), but providing more than the same resistance to a belt lifting the tensioner away from the belt (spring windup direction) is desirable to control engine start up transients to slow combustion events and rapid engine acceleration during first firing. Further, this motion is desirable to control torque pulses of engines having lightweight flywheels or "dual mass" flywheels, where the combustion torque variation can exceed levels equal to the average accessory torque load at idle at the crankshaft driver pulley.

It is known to have asymmetric motion control using hydraulic linkage with directional fluid orifices that require a piston, an orifice, and a check valve, for instance see U.S. Pat. No. 5,924,947 to Williams. Such manipulation of fluid requires expensive and failure-prone dynamic seals and valves. It is known to have non-hydraulic asymmetric motion control systems that do not have viscous damping, for instance see U.S. Pat. No. 4,822,322 to Martin et. al. and U.S. Pat. No. 4,583,962 to Bytzek.

It is also known to have asymmetric motion control using dry or lubricated surface friction, such as a brake band, which is limited in its ability to provide asymmetric motion by the amount of angular vector shift with a change in rotational direction and that requires excessive rotational motion to tighten the band in the high torque direction, for instance see U.S. Pat. No. 5,354,242 to St. John.

It is also known to have asymmetric motion control using damping friction surfaces that are limited in friction torque developed by the amount of normal load that can be generated by a spring and that need lots of angular displacement to engage and disengage, where the displacement is amplified by a conical wedging action, for instance see U.S. Pat. No. 5,935,032 to Bral.

It is also known to have asymmetric motion control using an "elastomer sandwich" that is severely limited in range of operation by the very steep spring rates of the compressed elastomers and the tensioner suffers from a lack of angular rigidity since its center of pivot floats, and thus is not absolutely controlled, for instance see U.S. Pat. No. 5,171,188 to Lardrot.

The present embodiments overcome these deficiencies and accomplish the above-discussed functions for asymmetric motion control, and can be applied to any conventional rotating tensioner that uses a rotational spring to rotate the tensioner arm toward the belt to create belt tension.

SUMMARY

One manifestation provides a belt tensioner that utilizes asymmetric motion control for a power transmission belt that operates on an endless path. The tensioner has an arm with a belt engaging section and a drum section, a support member for securing the tensioner relative to the belt, where the arm pivots on the support member, and a tension spring that urges the arm to pivot about the support member in a first direction and urges the belt engaging section against the belt with a force to tension the belt. The tensioner also has a fluid containing chamber located inside a portion of the drum section of the arm. The tensioner may also have a valve pivotally attached to the tensioner so that the valve extends across the fluid containing chamber.

Another aspect may be to provide a housing for the spring in the tensioner.

Another aspect may be to provide sealing devices.

Another aspect may be to provide a biasing device coupled to the valve.

Another aspect may be to provide a hydraulic fluid with a predetermined viscosity, such that the tensioner may be tuned and a desired viscous damping coefficient may be established.

Another aspect may be to provide the valve and chamber so that they may move relative to each other, where the valve may remain open in a first direction of motion and may close and lock against a portion of the tensioner in a second direction of motion, such that a damping force may be generated through the locking.

Another aspect may be to provide a hub on the support member about which the arm pivots.

Another aspect may be to provide a new method for utilizing a belt tensioner, a manifestation having one or more of the novel features as set forth above or hereinafter shown or described.

Other aspect, uses, and advantages of the embodiments are apparent from a reading of this description, which proceeds with references to the accompanying drawings form a part thereof and wherein:

DESCRIPTION OF THE PREFERRED EMBODIMENTS

Figure 1:
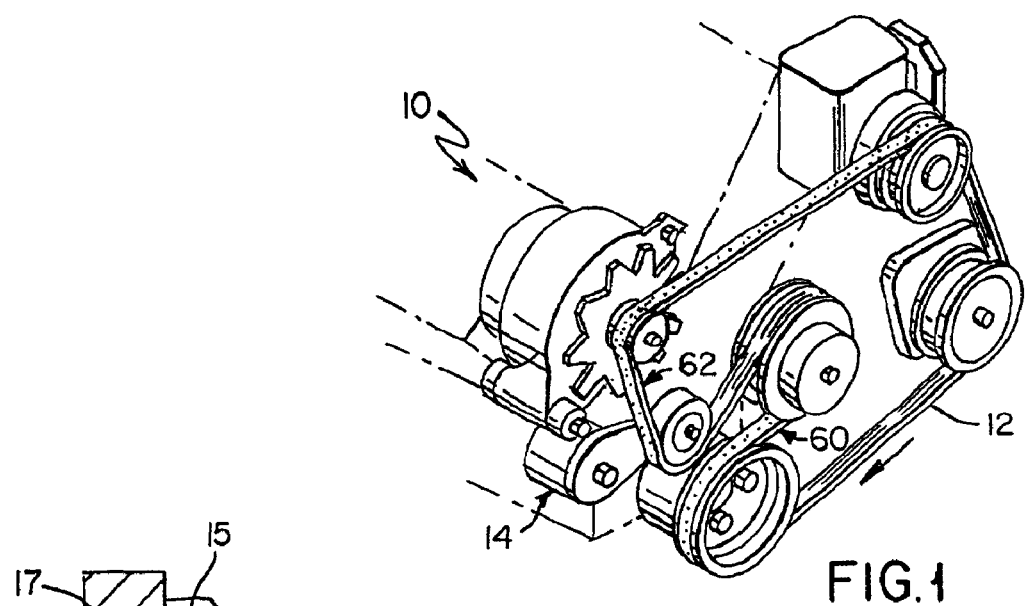
FIG. 1 is a perspective view of an automobile engine that utilizes a new belt tensioner.

While various features are hereinafter illustrated and described as providing a belt tensioner for a particular power transmission belt of a particular motor vehicle engine, it is to be understood that the various features can be utilized singly or in any combination thereof to provide a belt tensioner for other arrangements as desired. Therefore, the embodiments are not to be limited to only to those illustrated in the drawings, because the drawings are merely utilized to illustrate one of the wide variety of uses of the embodiments.

Referring now to FIG. 1, an automobile engine may be generally indicated by reference numeral 10 and may utilize an endless power transmission belt 12 for driving a plurality of driven accessories, as is well known in the art. The new belt tensioner is generally indicated by reference numeral 14 and is utilized to provide a predetermined tensioning force on the belt 12 in a manner hereinafter set forth. The endless power transmission belt 12 may be of any suitable type known in the art. The belt 12 may be made primarily of polymeric material because the unique features of the tensioner 14 readily permit the tensioner 14 to tension a belt having a load carrying cord in an effective manner as fully set forth in the aforementioned patent to Henderson, U.S. Pat. No. 4,596,538 whereby this U.S. Patent is being incorporated into this disclosure by reference.

Figure 2:
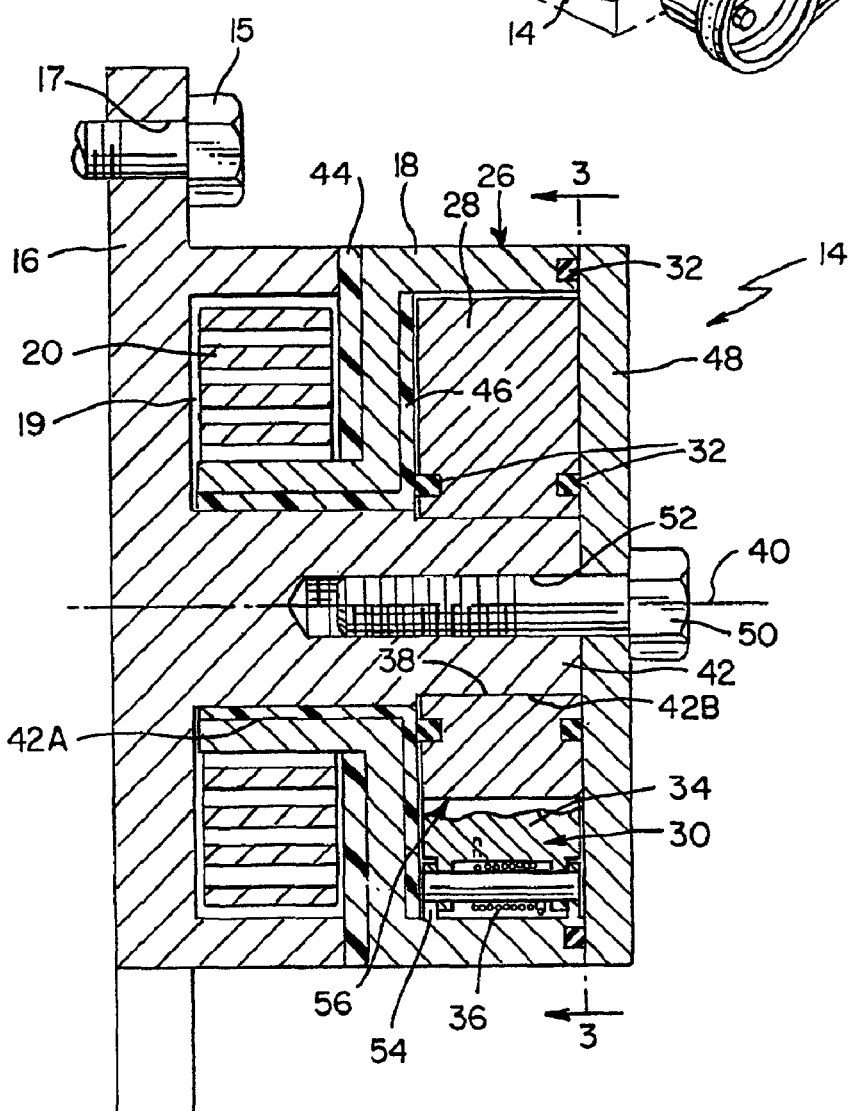
FIG. 2 is a section view of a tensioner of one embodiment.
Figure 3:
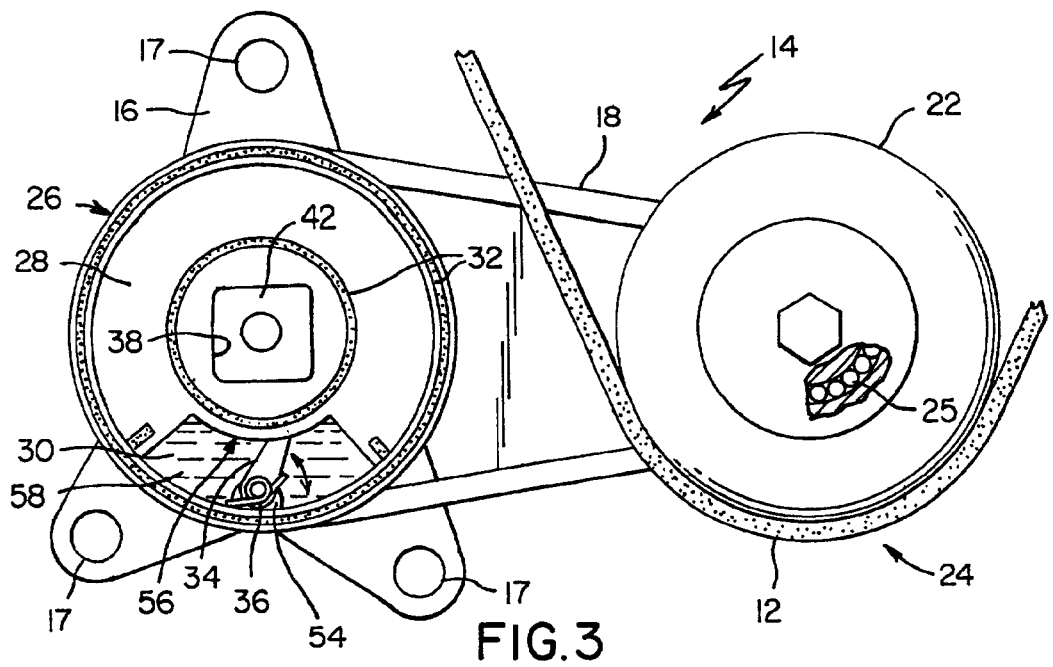
FIG. 3 is a top view of the tensioner in FIG. 2 looking into the tensioner at line 3—3 of FIG. 2.

As best illustrated in FIGS. 2–3, the tensioner 14 comprises a support member 16 formed of any suitable structural material, which may be configured to be fixed to a mounting bracket or support structure (not shown) of the engine 10 by any known fastening devices 15 extending through suitable apertures 17 in the support member 16 as fully set forth in the aforementioned patent to Henderson, U.S. Pat. No. 5,443,424, whereby this U.S. Patent is being incorporated into this disclosure by reference. A belt engaging arm 18 is moveably carried by the support member 16 in a manner hereinafter set forth, and may be formed of any suitable structural material, such as aluminum material.

The tensioner 14 further comprises a housing 19 that houses a spring 20, where the spring 20 has an inner end that is operatively interconnected to the support member 16 and an outer end that is operatively interconnected to the belt engaging arm 18. The spring 20 may comprise a substantially flat, metallic member wound in a spiral manner to define spirals or coils, where an inner spiral is adjacent the inner end and an outer spiral may be adjacent the outer end. The spring 20 is wound up in such a manner that when it is disposed in the tensioner 14, the spring 20 urges a belt engaging pulley 22 of the belt engaging arm 18 against the belt 12 to tension the same with a predetermined tension in a manner fully set forth in the above-mentioned patents. Although, a spiral flat cross section spring may be used because it takes up less space in the tensioner, as is know in the art any spring may be utilized, such as a helical coil round cross-section, compression, or tension linear spring that, while less expensive, take up more room in the housing 19 because they have a longer barrel. The belt engaging pulley 22 is rotatably mounted to an end 24 of the arm 18 by suitable bearings 25 in a manner well known in the art. With continuing reference to FIGS. 2–3, the belt engaging arm 18 further comprises a drum section 26, which forms a cavity with the support 16. Within the cavity of the drum section 26 are a stationary chamber annulus 28, a fluid containing chamber 30 defined in the stationary chamber annulus 28, sealing devices 32, and a valve 34. The valve 34 may be a door or flat rod-like shape and is pivotally attached to the tensioner 14 so that is extends normally from the tensioner 14 and across the fluid containing chamber 30, where the valve 34 may be biased with a spring device 36. In other embodiments the valve 34 may be biased with a weight. The stationary chamber annulus 28 further comprises an elongated hole 38, centrally aligned along a longitudinal axis 40 of the tensioner 14, through which a hub 42 of the support member 16 is passed, such that the stationary chamber annulus 28 may be non-moveably secured to the hub 42. Also, the arm 18 pivots around the hub 42. The hub 42 may have a circular lower section 42A and a square upper section 42B.

Again with reference to FIGS. 2–3, the tensioner further comprises a first bearing 44 that is located between the cavity 19 and the drum section 26. Also, a second bearing 46 is located between the support member 16 and the drum section 26 and between the stationary chamber annulus 28 and the drum section 26. The tensioner further comprises a retaining plate 48 that may be secured to the hub 42 by coupling a securing device 50 into a threaded hole 52 in the hub 42. The bearings 44 and 46 may be manufactured from high grade nylon with reinforcement for compressive and shear strength, and microscopic porosity to retain grease, as manufactured by DuPont and Dow.

Again with reference to FIGS. 2–3, the valve 34 may be coupled to a portion 54 of the drum section 26. During a first operation state, maybe steady state, the tensioner arm 18 may rotate in a first direction towards the belt 12, maybe the spring unwinding direction or clockwise direction. While the tensioner arm 18 may be moving toward the belt 12 to take up slack the tensioner arm 18 moves with very little resistance, just bearing and seal friction. During this state, the valve 34 is open to allow the fluid to easily flow past the valve 34. During the first state, a tension between the belt 12 and the tensioner 14 may be around 80 Pounds.

In contrast, when the arm 18 travels in an opposite, second direction, maybe a spring windup or counter-clockwise direction, a dynamic event occurs that may try to lift the tensioner 14 with the belt 12. This may be a second operation state, or non-steady state, where the tension in the belt 12 at tensioner 14 can reach 300 pounds. This event can be the unloading of an accessory, producing more tension in a slack span 60 (FIG. 1), or a rapid engine deceleration, which causes the inertia of one or more accessories to pull against an engine driver pulley through the belt 12 at a tensioner belt span 62 (FIG. 1). During this event, it may be desirable for the tensioner arm 18 to resist this motion with a greater torque than may be normally provided by the spring 20. Therefore, when the belt 12 tries to lift the tensioner arm, the valve 34 closes and locks against the inside surface 56 of the chamber 30, which locks the arm 18 based on the direction of fluid motion that begins to occur. Over time, a fluid 58, which may be any hydraulic fluid whose viscosity may be varied to tune the tensioner arm 18 or change the viscous damping coefficient, in the chamber 30 may leak past the valve 34, allowing the spring device 20 to control the belt tension. Thus, a significant amount of asymmetric, hydraulic, viscous damping torque is generated. The amount of high damping that occurs may be controlled by a size of the valve 34, where the valve 34 may be designed to fit tight in the closed state or designed with more clearance to control the amount of high damping, i.e., more clearance results in less damping. Accordingly, the greater the transient condition trying to lift the tensioner 14, the greater the arm 18 resists the motion. As soon as the dynamic event is over, the torque of the spring 20 generates sufficient motion of the arm 18 in the spring unwind direction to unlock the valve 34.

Figure 5:
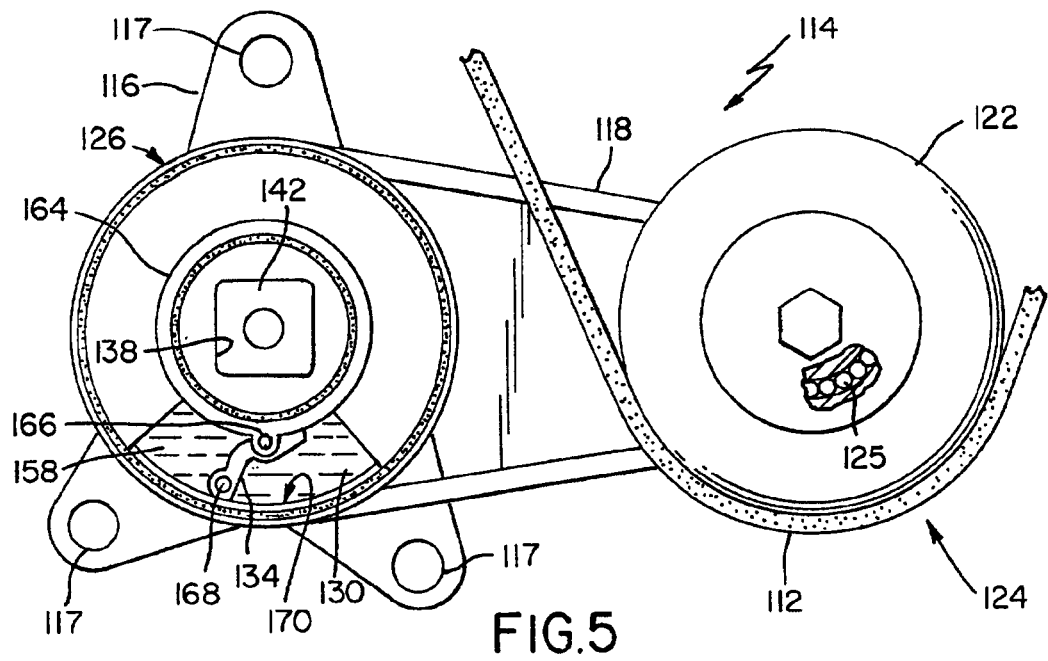
FIG. 5 is a top view of the tensioner of FIG. 4 looking into the tensioner at line 5—5 of FIG. 4.
Figure 4:
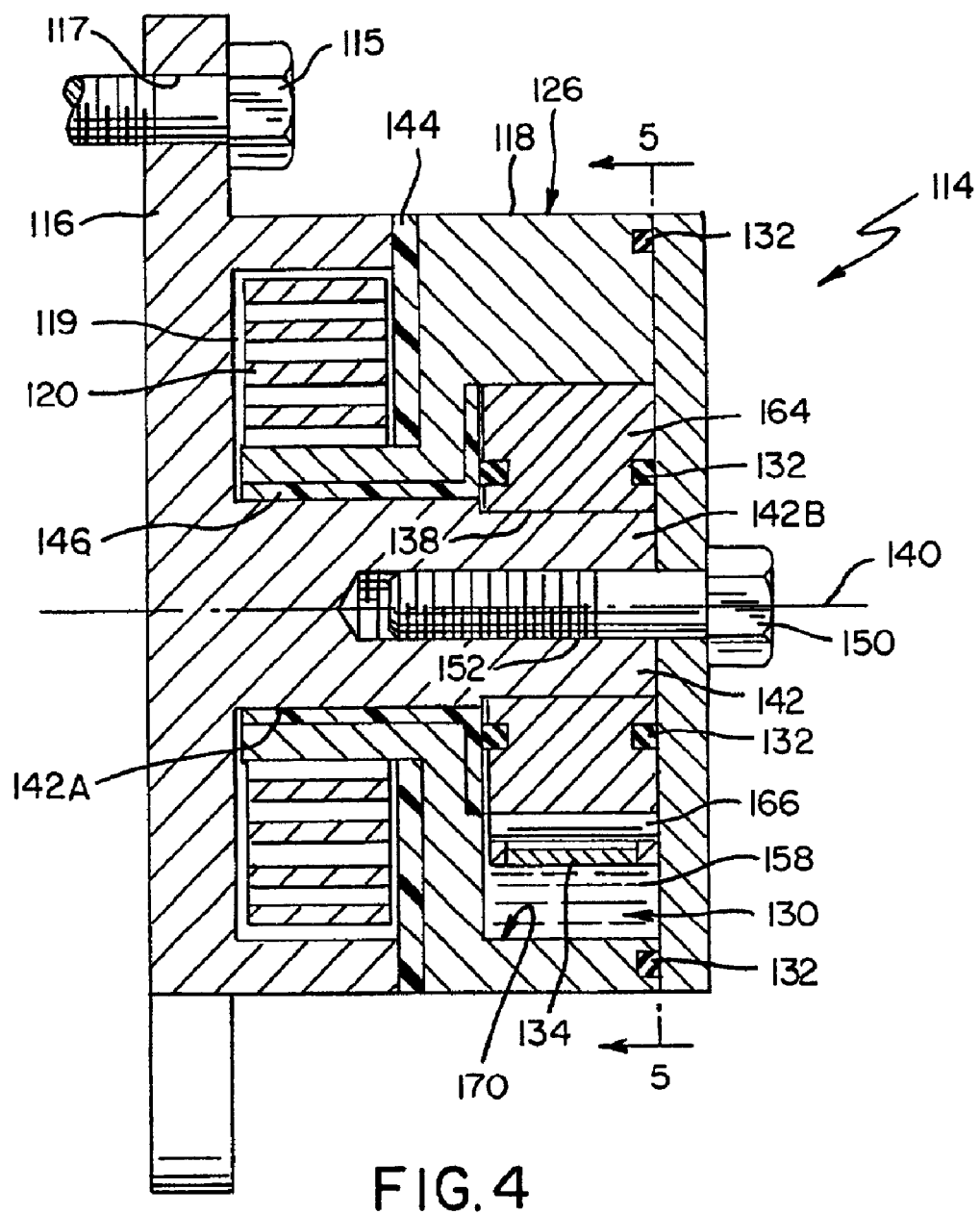
FIG. 4 is a section view of a tensioner of another embodiment.

Turning now to FIGS. 4–5, another possible embodiment of the tensioner 114 is shown. For convenience, all similar parts have similar reference numbers, except for a 100 designation, therefore only differences between the two embodiments are discussed. The tensioner 114 comprises a stationary valve plate 164 coupled to the hub 142, which replaces the stationary chamber annulus 28 of the embodiment previously discussed. Also, the fluid filled chamber 130 is defined in a portion of the drum section 126, and not the stationary chamber annulus 28. The valve 134 is pivotally coupled to the stationary valve plate 164 via a coupling device 166. Hence, in this arrangement the chamber 130 moves with the arm 118 and the valve 134 is stationary. The chamber 130 may be at the bottom of the drum section 126 because the pivot for valve 134 is stationary. Thus, the valve 134 may be located by gravity in its closed position. In this arrangement, not much force is needed to positioned the valve 134 because any motion of the fluid 158 sets the valve 134 in either a locked open or locked shut position. Therefore, there may be no requirement for the spring 36. Although, the use of a spring 136 or a weight 168 to locate the valve 134 in it closed position may be desired.

With continuing reference to FIGS. 4–5, an operation of this embodiment will be described. During a first operation state, maybe steady state, the tensioner arm 118 rotates in a first direction towards the belt 112, maybe the spring unwinding direction or clockwise direction. While the tensioner arm 118 may be moving toward the belt 112 to take up slack the tensioner arm 118 moves with very little resistance, just bearing and seal friction. During this state, the valve 34 is open to allow the fluid to easily flow past the valve 134. During the first state, a tension in the belt 112 at the tensioner 114 may be around 80 PSI.

In contrast, when the arm 118 travels in an opposite, second direction, maybe a spring windup or counterclockwise direction, a dynamic event occurs that may be trying to lift the tensioner arm 118 with the belt 112. This may be a second operation state, or non-steady state, where a reverse tension in the belt 112 at the tensioner 114 can reach 300 PSI. This event can be the unloading of an accessory, producing more tension in a slack span 60 (FIG. 1), or a rapid engine deceleration, which causes the inertia of one or more accessories to pull against an engine driver pulley through the belt 112 at a tensioner belt span 62 (FIG. 1). During this event, it may be desirable for the tensioner arm 118 to resist this motion with a greater torque than may be normally provided by the spring 120. Therefore, when the belt 112 tries to lift the tensioner arm, the valve 134 closes and locks against the inside surface 170 of the chamber 130, which locks the arm 118 based on the direction of fluid motion that begins to occur. Over time, a fluid 158, which may be any hydraulic fluid whose viscosity may be varied to tune the tensioner 114 or change the viscous damping coefficient, in the chamber 130 may leak past the valve 134, allowing the spring device 120 to control the belt tension. Thus, a significant amount of asymmetric, hydraulic, viscous damping torque may be generated. The amount of high damping that occurs may be controlled by a size of the valve 134, where the valve 134 may be designed to fit tight in the closed state or designed with more clearance to control the amount of high damping, i.e., more clearance results in less damping. Accordingly, the greater the transient condition trying to lift the tensioner 14, the greater the arm 118 resists the motion. As soon as the dynamic event is over, the torque of the spring 120 generates sufficient motion of the arm 118 in the spring unwind direction to unlock the valve 134.

The tensioner is unidirectional, as described above, because the rotational motion of the locking of the door 34 or 134 is counter clockwise only. Also, the asymmetrical damping may be accomplished by allowing the damping to be higher when the belt 12/112 tries to lift the tensioner arm 18/118 than when the tensioner arm 18/118 moves with the belt 12/112. Essentially, there may be no damping when the tensioner arm 18/118 moves toward the belt 12/112. It is to be appreciated that the spring windup direction may be either clockwise or counterclockwise, as can be the spring unwinding direction. This would be accomplished by using a mirror image tensioner.

The embodiments have been described in detail with respect to specific embodiments thereof, but it will be apparent that numerous variations and modifications are possible without departing from the spirit and scope of the embodiments as defined by the following claims.

What is claimed:

1. A tensioner for a power transmission belt that operates on an endless path and that utilizes asymmetric motion control, the tensioner comprising:

an arm comprising a belt engaging section and a drum section;

a support member for securing the tensioner relative to the belt, the arm pivoting on the support member;

a spring that urges the arm to pivot about the support member in a first direction and urges the belt engaging section against the belt with a force to tension the belt;

a fluid containing chamber located inside a portion of the drum section of the arm; and a valve pivotally attached to the tensioner so that the valve extends across the fluid containing chamber.

2. The tensioner of claim 1, further comprising sealing devices.

3. The tensioner of claim 1, wherein the valve is biased by a weighted device.

4. The tensioner of claim 1, wherein the valve is biased by a spring device.

5. The tensioner of claim 1, wherein a fluid in the fluid filled chamber is a hydraulic fluid with a predetermined viscosity, such that the tensioner can be tuned and an desired viscous damping coefficient can be established.

6. The tensioner of claim 1, further comprising:
a stationary valve plate coupled to a first portion of the drum section, wherein the valve is coupled to the stationary valve plate;
wherein the chamber is coupled to a second portion of the drum section;
wherein the chamber moves with respect to the valve, wherein when the chamber moves in a first direction the valve opens and when the chamber moves in a second direction the valve closes and locks against a portion of the tensioner such that a damping force is generated based on the fluid in the chamber pushing against the closed and locked valve.

7. The tensioner of claim 1, wherein the valve and the chamber move relative to each other and wherein the valve remains open in a first direction of motion and closes and locks against a portion of the tensioner in a second direction of motion to lock, such that a damping force is generated through the locking.

8. The tensioner of claim 1, wherein the support member comprises a hub about which the arm pivots.

9. The tensioner of claim 1, wherein the belt engaging section includes a pulley.

10. The tensioner of claim 1, wherein the support member comprises a housing for the spring.

11. The tensioner of claim 10, wherein after the valve locks against the portion of the tensioner a predetermined amount of a fluid in the chamber leaks adjacent the valve.

12. The tensionser of claim 1 wherein the valve is operably mounted on the support member, which remains stationary when the arm pivots, and the chamber is formed in a portion of the drum section which moves as the arm pivots such that the chamber moves with respect to the valve.

13. The tensioner of claim 12 wherein the drum section includes an annular member in which the chamber is formed and wherein the annular member moves with the arm as the arm pivots.

14. A tensioner for a power transmission belt that operates on an endless path and that utilizes asymmetric motion control, the tensioner comprising:
an arm comprising a belt engaging section and a drum section;
a support member for securing the tensioner relative to the belt, the arm pivoting on the support member;
a spring that urges the arm to pivot about the support member in a first direction and urges the belt engaging section against the belt with a force to tension the belt;
a fluid containing chamber located inside a portion of the drum section of the arm; and
a valve pivotally attached to the tensioner so that the valve extends across the fluid containing chamber;
wherein the valve is coupled to the drum section and moves with respect to the chamber, wherein when the valve moves in a first direction the valve opens and when the valve moves in a second direction the valve closes and locks against a portion of the tensioner such that a damping force is generated based on the fluid in the chamber pushing against the closed and locked valve.

15. A method of utilizing a tensioner for maintaining a predetermined tension on a power transmission belt to be operated on an endless path, the method comprising the steps of:
providing an arm comprising a belt engaging section and a drum section;
providing a support member configured to be secured relative to the belt, the support member comprising a hub having a longitudinal axis and being fixed from movement relative to the belt engaging section, the hub moveably holding the arm;
providing a spring operatively interconnected to the arm and the support member, the spring being configured to urge the belt engaging section relative to the support member and against the belt with a force to provide the predetermined tension on the belt;
providing a fluid containing chamber located inside a portion of the drum section of the arm; and
providing a valve pivotally attached to the tensioner so that the valve extends across the fluid containing chamber.

16. The method of claim 15, further comprising the step of providing sealing devices.

17. The method of claim 15, further comprising the step of moving the chamber relative to the valve wherein with movement in a first direction the valve remains open and with movement in a second direction the valve closes and locks against a portion of the tensioner, such that a damping force is generated.

18. The method of claim 15, wherein the valve is coupled to the drum section and the chamber moves with respect to the valve, wherein when the chamber moves in a first direction the valve opens and when the chamber moves in a second direction the valve closes and locks against a portion of the tensioner such that a damping force is generated based on the fluid in the chamber pushing against the closed and locked valve.

19. The method of claim 15, further comprising the step of:
providing a stationary valve plate coupled to a first portion of the drum section, wherein the valve is coupled to the stationary valve plate;
wherein the chamber is coupled to a second portion of the drum section;
wherein the chamber moves with respect to the valve, wherein when the chamber moves in a first direction the valve opens and when the chamber moves in a second direction the valve closes and locks against a portion of the tensioner such that a damping force is generated based on the fluid in the chamber pushing against the closed and locked valve.

20. A tensioner for a power transmission belt that operates on an endless path and that utilizes asymmetric motion control, the tensioner comprising:
an arm comprising a belt engaging section and a drum section;
a support member for securing the tensioner relative to the belt, the arm pivoting on the support member;
a spring that urges the arm to pivot about the support member in a first direction and urges the belt engaging section against the belt with a force to tension the belt;
a fluid containing chamber located inside a portion of the drum section of the arm; and
a valve pivotally attached to the tensioner so that the valve extends across the fluid containing chamber;
wherein the chamber is stationary when the arm pivots and the valve is mounted on a portion of the drum section which moves when the arm pivots such that the valve moves with respect to the chamber.

21. The tensioner of claim 20 wherein the drum section includes an annular member in which the chamber is formed.

22. The tensioner of claim 21 wherein the annular member remains stationary when the arm pivots.

* * * * *